United States Patent [19]

Sharif-Askary et al.

[11] Patent Number: 5,649,190
[45] Date of Patent: Jul. 15, 1997

[54] MULTI-MODEL DATABASE SYSTEM FOR DYNAMIC CREATION AND MAINTENANCE OF COMPLEX OBJECTS IN A REAL TIME ENVIRONMENT

[75] Inventors: Jamshid Sharif-Askary, Palm Bay; Shashi Garje; Vijay Rohela, both of Melbourne; Ashok I. Roy, Palm Bay; Irahim Yaseen, Melbourne, all of Fla.

[73] Assignee: Harris Corporation, Melbourne, Fla.

[21] Appl. No.: 596,691

[22] Filed: Feb. 5, 1996

Related U.S. Application Data

[63] Continuation of Ser. No. 260,299, Jun. 14, 1994, abandoned.

[51] Int. Cl.$^6$ .............................. G06F 15/00; G06F 17/28
[52] U.S. Cl. ................... 395/612; 395/604; 395/200.02; 395/200.03; 395/200.05; 395/200.09; 364/DIG. 1; 364/282.1; 364/284.4; 364/274.3
[58] Field of Search .................. 395/200.05, 200.02, 395/200.03, 200.09, 604, 612; 264/DIG. 1

[56] References Cited

U.S. PATENT DOCUMENTS

| | | | |
|---|---|---|---|
| 4,769,772 | 9/1988 | Dwyer | 364/300 |
| 5,181,239 | 1/1993 | Jolissaint | 379/96 |
| 5,191,522 | 3/1993 | Bosco et al. | 364/401 |
| 5,212,789 | 5/1993 | Rago | 395/600 |
| 5,226,158 | 7/1993 | Horn et al. | 395/600 |
| 5,276,885 | 1/1994 | Milnes et al. | 395/700 |
| 5,307,484 | 4/1994 | Baker et al. | 395/600 |
| 5,321,608 | 6/1994 | Namba et al. | 364/419.08 |
| 5,345,586 | 9/1994 | Hamala et al. | 395/650 |
| 5,481,700 | 1/1996 | Thuraisingham | 395/600 |
| 5,555,408 | 9/1996 | Fujisawa et al. | 395/600 |
| 5,584,024 | 12/1996 | Schwartz | 395/604 |

*Primary Examiner*—Thomas G. Black
*Assistant Examiner*—Jean R. Homere
*Attorney, Agent, or Firm*—Evenson, McKeown, Edwards & Lenahan P.L.L.C.

[57] ABSTRACT

A database system having a logical database, a knowledge base and a client information module is provided. The knowledge base contains knowledge regarding semantic and syntactic constraints of data relationships of data contained in the logical database. The client information module is coupled between the logical database and the knowledge base, the client information module providing an interface between a user of the database system and allowing use of the logical database according to the knowledge contained in the knowledge base. Since the knowledge necessary to maintain consistency in the database system is already contained in the knowledge base, a user can use the database system, which may contain a plurality of different relational databases, without extensive expertise in the particular databases.

12 Claims, 4 Drawing Sheets

MULTI-MODEL DATABASE SYSTEM FOR DYNAMIC CREATION AND MAINTENANCE OF COMPLEX OBJECTS IN A REAL TIME ENVIRONMENT

This application is a continuation of application Ser. No. 08/260,299, filed on Jun. 14, 1994, now abandoned.

FIELD OF THE INVENTION

The present invention relates to the field of databases, and more particularly, to a database administration system for an enterprise wide database system.

BACKGROUND OF THE INVENTION

An enterprise wide database system is one that makes interdepartmental data available throughout an enterprise having geographically separated nodes that are connected together, for example by a local area network (LAN) or a wide area network (WAN). These systems typically employ a number of different, individual databases connected to the system that are often produced by different vendors. This set of circumstances causes a number of problems.

Forms are used in typical databases to provide users with an abstract "view" of that database. This user view hides the complexity of the underlying data structures from the user, provides a level of data independency and an easy data entry environment. However, in typical databases, the generation and creation of such views, the maintenance of the database and the updating of the database are costly, cumbersome and problematic. For example, to generate a view, a user is required to have a high level of knowledge about a particular database, a solid understanding of the underlying structures and the complex relationships among the data, and must have practical training and experience with the vendor specific forms for that particular database. There is therefore a problem with vendor monopoly, since users are often reluctant to change a database management system due to the extensive conversion process and training costs involved.

Another concern is data independency since most forms of typical databases use "joins" (relational join operations) of tables to present a unified view of data for an easy data entry environment. Very few such views can be correctly updated because an update in one view can be translated to more than update in the base relations. Furthermore, if there is a change or reorganization in the underlying data (i.e., the base tables), all the forms, including their definition, update algorithm and presentation, may have to change requiring major reworking in their definition.

A third problem in the prior art is that of ease of use and maintenance. A modification of a form (e.g., adding a new field, or changing syntax or semantic in a particular field) is time consuming and costly. This is due to the static nature of the typical definition and processing algorithm for forms. This requirement of maintaining an engine for each form, as well as for vendor specific forms, presents a major software maintenance need.

SUMMARY OF THE INVENTION

There is a need for a database administration system that provides data independency, vendor independency, and location transparency, is easy to use and maintain, and allows for a complex relationship among the data to satisfy the needs of complex applications.

These and other needs are met by the present invention which provides a database system comprising a logical database; a knowledge base containing knowledge regarding semantic and syntactic constraints of data relationships of data contained in the logical database; and a client information module coupled between the logical database and the knowledge base, the client information module providing an interface between a user of the database system and allowing use of the logical database according to the knowledge contained in the knowledge base.

The present invention overcomes the shortcomings of the prior art and provides users with a user-friendly, vendor independent user interface environment. With the present invention, users can define and maintain the database system by dynamically defining customized views. Based upon this view definition, a single view engine determines all the database update operations as specified. Thus, with little or no understanding of the underlying data organization, end users are able to perform database maintenance in a centralized or distributed database environment.

By using knowledge engineering in which the schema definition, syntax and semantic checks, cardinality constraints, etc. are captured in the knowledge base, an extended catalogue (logical database) is created, which forms a foundation for dynamic views (forms). The knowledge base is used by the client interface module to store processing specifications. These specifications are used by the client interface module to process the data entered by the user.

The logical database is used to map the conceptual schema of the logical database to vendor specific databases using a set of knowledge base utilities. This knowledge engineering resident in the knowledge base relieves an administrator from maintaining a separate engine for each form, thereby providing vendor independency.

Other objects, advantages and novel features of the present invention will become apparent from the following detailed description of the invention when considered in conjunction with the accompanying drawings.

DETAILED DESCRIPTION OF THE DRAWINGS

Figure 1:
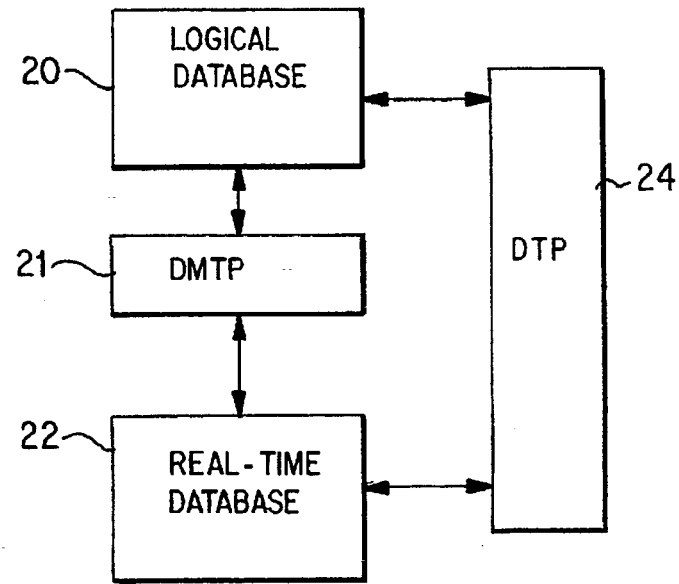
FIG. 1 illustrates an embodiment of the basic architecture of the present invention.

FIG. 1 illustrates the basic database architecture of the present invention. This architecture includes a logical database system 20, a physical database system 22 and distributed transaction processing architecture 24. The logical database system 20 provides a user with object-oriented and relational database representations of systems utilizing a frame-based knowledge representation scheme. The physical database system 22 is a real-time database having high-performance access characteristics (e.g., 1000 or more accesses per second). The real-time database 22 is a series of Unix files, for example, with specific access routines that optimize data storage and retrieval for a particular environment and applications. The real-time database 22 is generated from the logical database 20 using a data model transformation process 21 (DMTP). The logical database 20 is a source database made up of one or more commercially available relational databases. This source database represents the relational image of the real-time database 22. When data is accessed, updated, deleted, etc. the DMTP 21 converts the data from the tables typically used to represent data in commercial relational databases, to the real-time data representations of data used in performance oriented real-time databases. Such a conversion is readily programmable by one of ordinary skill in the art. This logical/physical database architecture thereby insulates the user from the underlying real-time data structures of the real-time database.

The distributed transaction processing architecture 24 handles the operational characteristic of data which is distributed across nodes on a local area network (LAN) and across geographically distributed sites. The distributed database system of the present invention provides a location transparency which isolates users at different nodes from the distributed nature of the system and provides them a single local view of the system. Thus, a user of the system in Tulsa may be provided with the same view of the system as a user in Atlanta.

The logical data model of the logical database system 20 provides the user with a conceptual and logical view of the physical database (the real-time database 22). This shields the user from the organization complexity of the actual physical structures, and provides a portable means of representing the real-time data items of the LAN system.

Figure 2:
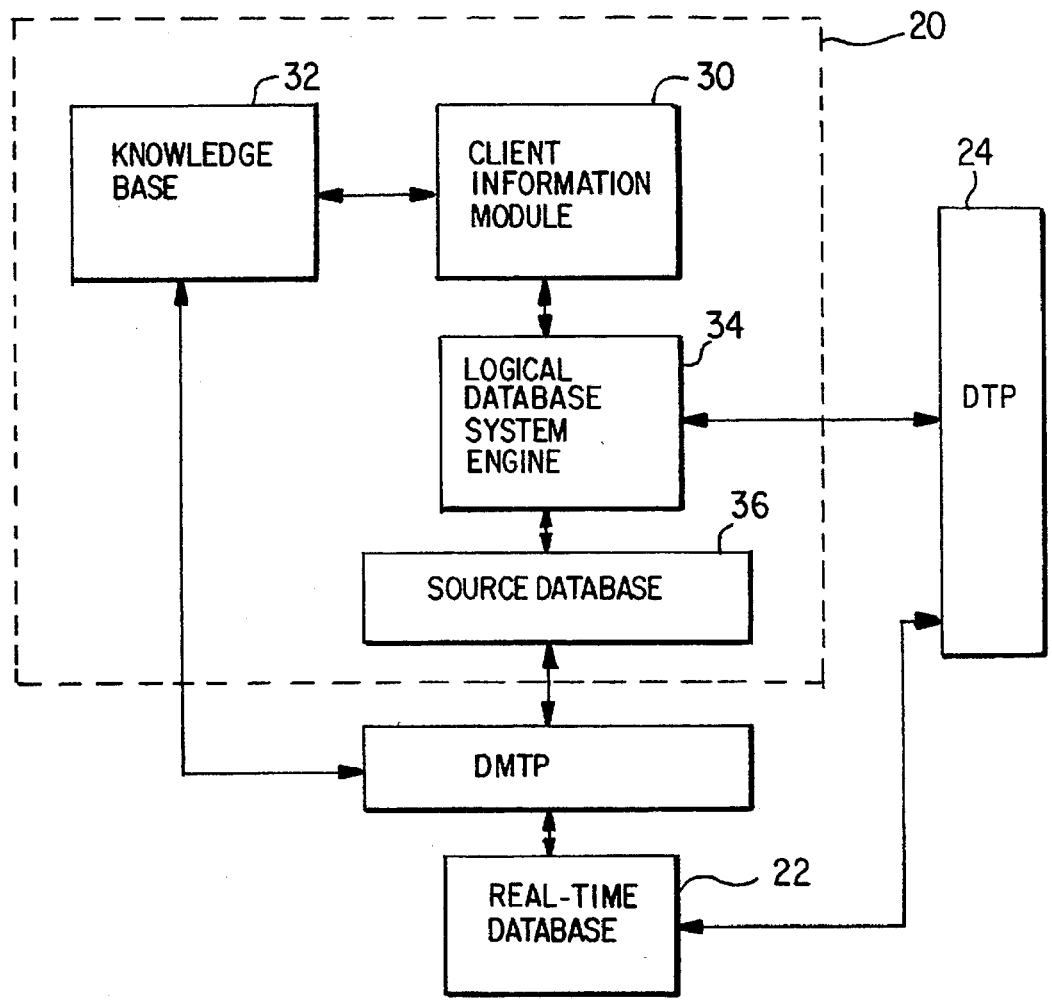
FIG. 2 is a block diagram of the system of FIG. 1, but with additional detail of the logical database system of FIG. 1.

The logical database system 20 of FIG. 1 is shown in more detail in the embodiment of FIG. 2. Logical database system 20 includes a client interface module 30 that is connected to a knowledge base 32 and a logical database system engine 34. The logical database system engine 34 is connected to one or a plurality of relational databases 36, with only one such database being shown in solid lines, with possible additional databases being shown in phantom lines. The additional relational databases 36 do not all have to be the same type of relational database, and may be supplied by different vendors. These different relational databases 36 will have different toolkits and methods to generate forms, and maintain and operate the different databases. A single user would normally be faced with a daunting task to maintain and operate the different relational databases, since one ordinarily needs to understand the various interrelationships within a particular database and corresponding toolkits. However, the logical database system 20, comprising the knowledge base 32, the logical database system engine 34 and the client interface module 30 of the present invention serve as an interface between the relational databases 36 and the user. The knowledge stored in the knowledge base 32, in conjunction with the logical database system engine 34, contains the specialized knowledge for generation, maintenance and operation of each of the different databases of the system. Thus, the user does not need to know how to use each of the individual, different relational databases.

One of the components of the logical database system 20 is the knowledge base 32 that utilizes object oriented data models to conceptualize underlying database structures. The knowledge base 32 contain the knowledge representation of all objects and classes in the entire database system, their relationships and their constraints. The knowledge base 32 is constructed by one of ordinary skill in the art based upon the requirements of the different databases. Object oriented concepts are used to represent the relationships between the different entities in the system application and real-time system environment.

In the knowledge base 32, a hierarchical representation of the entities and their relationships is constructed by an expert via generalizations and specializations. This hierarchical representation supports the class concept and leads to the elimination of redundant information that may be inherited from parent objects within the hierarchy. Definitions are stored with each object and describe the attributes and properties of the objects as well as procedures and methods for manipulating the object. The object hierarchy that is defined in the knowledge base 32 describes the elements of the complete system network. The knowledge base 32 therefore transforms the relational nature of the database to an object oriented nature. The system network encompasses data for the various apparatus, devices, data acquisition and control equipment, operational and procedural characteristics, and entities with temporal values of a system. (An example of a system is an electric utility power system).

Figure 5:
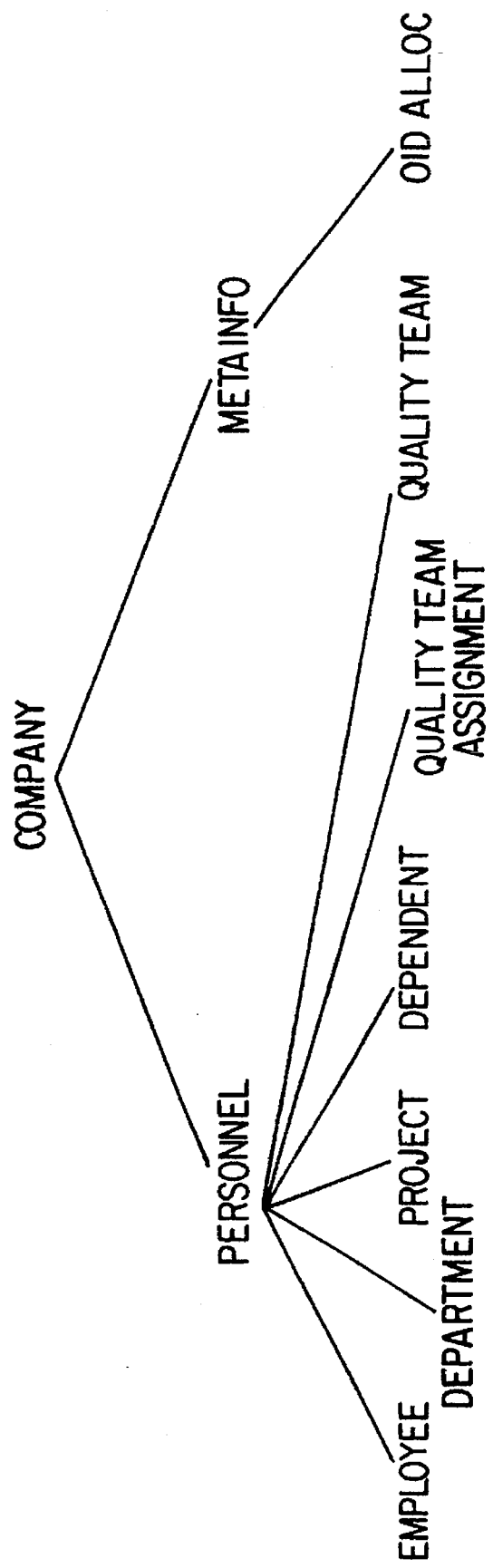
FIG. 5 is a diagram showing an exemplary embodiment of a class/object organization with generalization/specialization associations illustrated as links.

In a preferred embodiment of the present invention, the hierarchical structure of the source database 36 is represented as a class lattice. Classes are represented as labels, and the generalization-specialization associations are represented as links. This is illustrated more clearly in FIG. 5, which illustrates the hierarchical structure of the source database 36 for the example of a company.

A class is a collection of objects, either real or abstract, with similar characteristics. Every class in the system has one frame which is an ASCII file containing information about the class in a pre-specified format. The frame-hierarchy is organized using the object-oriented concepts of generalization-specialization and aggregation. In generalization-specialization, a class can inherit characteristics from other classes. The class that inherits characteristics is the specialization of the other and the class from which the characteristics are inherited is the generalization of the other. For example, the class Department is a specialization of the class Personnel, and the class Personnel is a generalization of the class Department.

The characteristics of a class are specified using aggregation. The frame corresponding to each class contains a set of aggregates, i.e., the name, the generalizations, the specializations and other aggregates of the class. In turn, every aggregate has a predefined number of attributes.

The ASCII files of the knowledge base 32 representing the frames are compiled into a binary file which stores the information using physical structures. This binary file is used by the data administration system during run time, specifically by the client interface module 30 and the logical database system engine 34.

Figure 6:
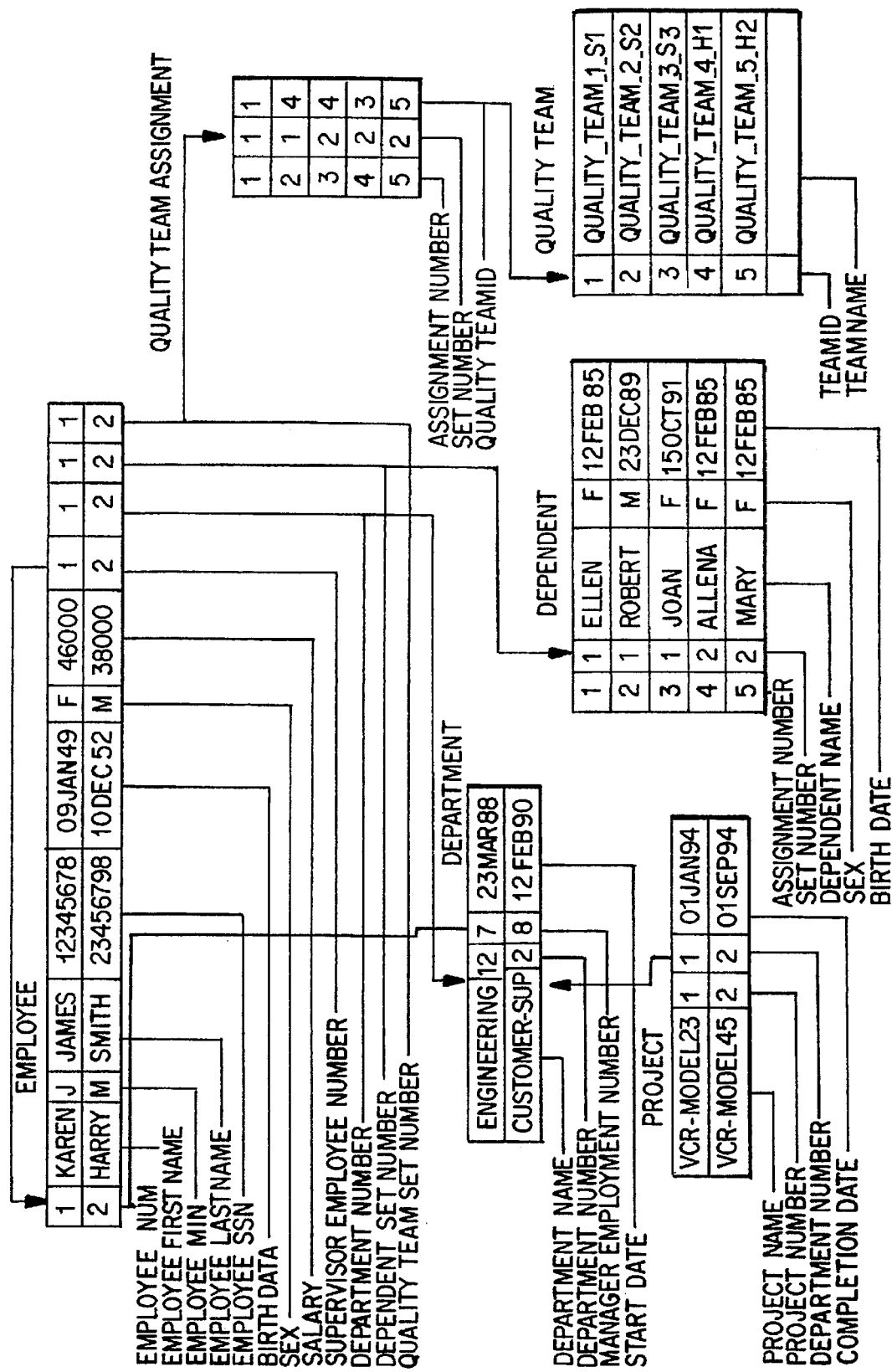
FIG. 6 illustrates a schema representation and object relationship for an example of a company database.

A schema representation and object relationship is provided by FIG. 6 for the above example of a company database. The database includes a number of objects, such as EMPLOYEE, DEPARTMENT, PROJECT and DEPENDENT. Each of the different objects has attributes, such as Department Name, Department Number, Manager Employee Number and Start Date, for the object DEPARTMENT. As can be seen from FIG. 6, the attribute Department Number is also an attribute of objects EMPLOYEE and PROJECT. Thus, there is a defined relationship between these different objects. Each of the attributes has an instance.

For the object DEPARTMENT and the attribute DepartmentName, for example, the instances are "engineering" and "customer-sup."

Figure 7:
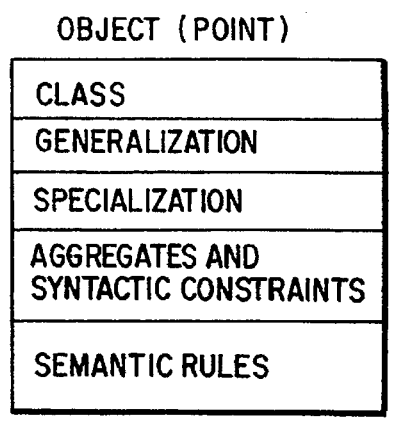
FIG. 7 shows a representation of an example of a frame as stored in the knowledge base shown in FIG. 2.

All of the above information is contained in the knowledge base 32 which is defined as a set of frames. A frame is an ASCII file providing schema information in a pre-defined format. The basic structure of an exemplary frame is shown in FIG. 7. Each frame in the knowledge base 32 contains information about an object in the hierarchy of the database system. This information includes the class of the object, information regarding whether that object is a generalization of other objects, and whether the object is a specialization of other objects. The frame includes aggregate information, and semantic knowledge regarding the object. This semantic knowledge is that knowledge necessary to maintain the integrity of the database system as a whole, and the relational database 36 and the real-time database 32 in particular. For example, the semantic knowledge in a frame for the object or class Employee may include the rule that each employee is assigned to a Quality team and is working on a specific project. When, for example, a new attribute is added to the frame for "Employee", the semantic knowledge included in that frame is used by the database administration system to assure that this new attribute will not corrupt the relationships and constraints of the object Employee to the other objects throughout the database system.

During normal operation, a selection mechanism allows the user to select a set of classes and perform operations against this set of classes. For instance, the user can display a list of aggregates (inherited as well as aggregates specific to that class) and then obtain help information on each one of the aggregates. The user may review the contents of the frame for that class and make modifications to the frame if the user has the required privileges. The user has the opportunity to review the diagram showing the foreign key connections for a particular class, select an instance of that class and inspect what instances of other classes are connected to that object instance. For a particular object instance, the user can also bring up an edit session.

Figure 4:
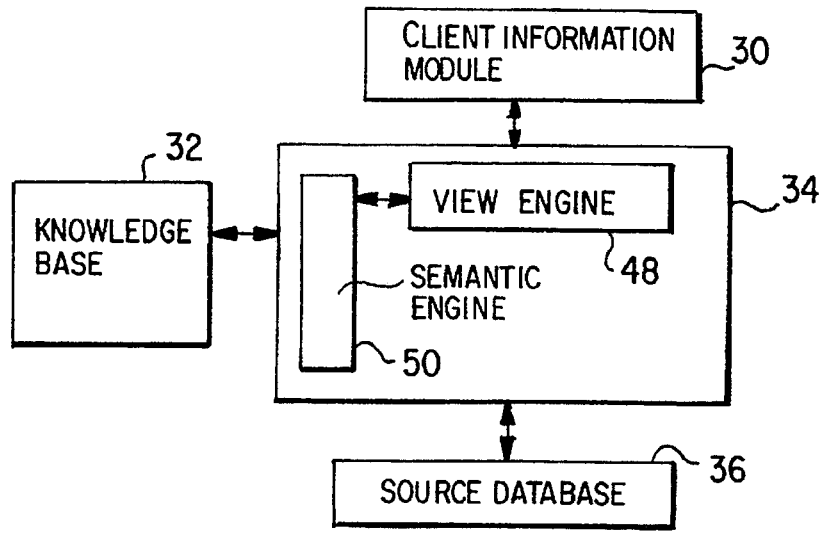
FIG. 4 is a block diagram illustrating in more detail the logical database system engine shown in FIG. 2.

The logical database system engine 34 of FIG. 2 is a multi-threaded server that uses the knowledge base 32 to provide vendor independent services to both the client interface module 30 and the application clients. The logical database system engine 34 also provides data integrity services that ensures the syntactic and semantic validity of the contents of the database. It also provides failure, recovery and rollback services, and acts as a transaction distribution interface to support operations for a geographically distributed logical database. The details of the logical database system engine will de discussed later with respect to FIG. 4.

The logical (or "source") database 36 includes a logical representation of all object instantiations. This logical database 36 contains one or more commercially available relational databases.

Figure 3:
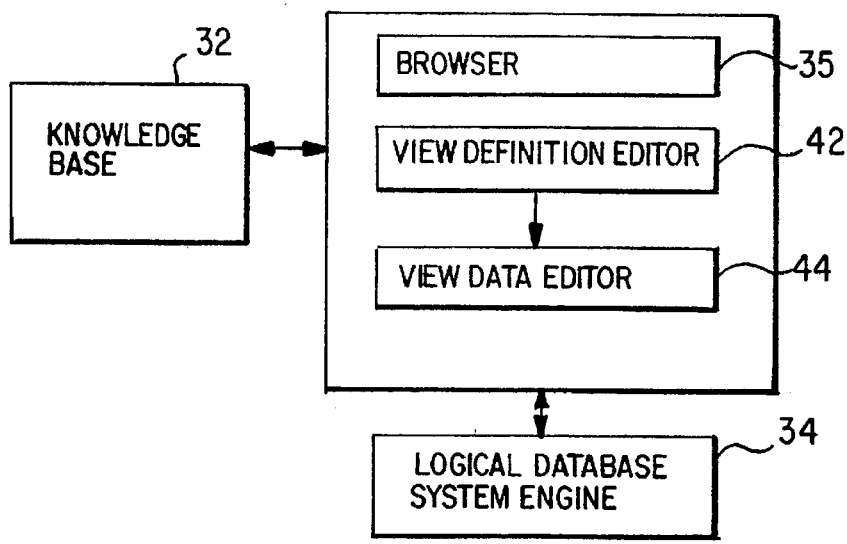
FIG. 3 is a block diagram showing in more detail the client information module shown in FIG. 2.

The client interface module 30 is a set of graphical interface tools which allow users to define, edit and browse objects in the database system. As shown in FIG. 3, the components of the client interface module are the browser module 35, a view definition editor 42, and a view editor 44.

The browser module 35 is a source database graphical tool that allows the user to study the entire database system, by traversing from one object to other objects through foreign key connections.

A dynamic view manager provides the users via the client interface module 30 a user-friendly interface environment for major database operations. This dynamic view manager can be considered to be formed by the view definition editor 42, the view editor 44, and a view engine 48 of the logical database system engine 34 illustrated in FIG. 4. Using the dynamic view manager, a user of the database administration system will define and maintain the database system by dynamically defining customized "views" (or "forms") using a tool, such as a point and click tool.

The view definition editor 42 is a window based point and click tool that allows an appropriately privileged user to define a "view". A view definition is a subset of the system knowledge base 32 to which some additional knowledge is added in order to handle the additional abstractness. Each parameter of this additional knowledge has a default value and the person defining the view is allowed to modify the view by choosing a value from a set of values presented to the user. Thus, a view is a customized collection of information contained in the database, as selected ("defined") by the user. Since the view definition editor uses the frames contained in the knowledge base in building a view, and since each frame contains semantic information to maintain consistency in the logical database 20, the rules necessary to maintain consistency when providing input to the source database 36 is already captured when a view is defined. The output of the view definition is a binary file.

The view data editor 44 is a data entry editor that allows a user to perform basic database operations such as select, insert, update, delete, share and unshare using the view once it has been defined with the view definition editor 42. The view data editor 44 runs based on the pre-defined views generated using the view definition editor 42. The view data editor 44 invokes a syntactic check on each of the fields. Use of the view data editor 44 ensures that operations performed by a user on a particular database will not make that database inconsistent and also makes unnecessary any detailed knowledge of the organization of the logical database 20. This is because the operations that are performed on the logical database 20, including semantic checks on the data, were pre-defined in the views.

The view engine 48 is a software engine that receives input from the view data editor 44 and applies the input to the source database (logical database 36) based on the rules that were captured during the definition of the view by the view definition editor 42.

Coupled to the view engine 48 is a semantic engine 50 which applies the semantic rules captured in the view definition to ensure that the semantic rules are followed when the input is applied to the source database 36.

In normal operation, a user will define a view, which includes the knowledge contained in the knowledge base 32 to maintain semantic and syntactic consistency. This view is a customized subset of the information contained in the database 36. In the company example described earlier, the view may be defined as EMPLOYEE with an instance (male) for the attribute Sex and that has a DEPENDENT. The view definition editor 42 determines whether the values provided by the user violate any rules, semantic or syntactic. Once a view has been defined, the user or other users may enter data into the database using this defined view. This data will be sent to the view engine 48 via the view data editor 44, with the appropriate semantic and syntactic checks performed, based upon the knowledge of the semantic and syntactic behavior already captured with the defined view. The view engine 48 provides the data to the source database 36 according to the appropriate rules. This data is then provided to the real-time database 22 via the data model transformation process 21, which transforms the data from the relational database structures to the structures used in the real-time database 22.

The example described above was for a company database. However, the present invention can be used for any number of different types of enterprise wide database systems, and finds particular utility in systems that are spread geographically, such as electric power utility company databases.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A database system comprising:

a logical database;

a knowledge base containing knowledge regarding semantic and syntactic constraints of data relationships of data contained in the logical database, said syntactic and semantic constraints provide rules for when and how data entered by a user is not acceptable, and ensuring syntactic and semantic validity of contents of the logical database and defining a behavior of said database;

a client information module coupled between the logical database and the knowledge base, the client information module providing a dynamic interface between the user of the database system and allowing use of the logical database according to the knowledge contained in the knowledge base, as well as generating information for the user by combining information from different objects of the logical database; and wherein the client interface module includes a dynamic view manager that forms a user interface and through which a user dynamically defines views, whereby real-time changes can be made to different objects.

2. The database system of claim 1, wherein the logical database includes a plurality of relational databases.

3. The database system of claim 2, further comprising a real-time database coupled to the logical database.

4. The database system of claim 3, further comprising means for performing a data model transformation process between the logical database and the real-time database.

5. The database system of claim 2, wherein the plurality of relational databases include different types of relational databases having different toolkits.

6. The database system of claim 2, wherein the knowledge base includes a mechanism to represent and capture structures of the relational databases using an object oriented data model.

7. The database system of claim 2, wherein the knowledge base contains knowledge representation of all objects and classes in the database system, relationships between the objects and classes, and constraints.

8. The database system of claim 2, wherein the knowledge base includes a stored set of frames containing information regarding the database in a pre-defined format.

9. The database system of claim 8, wherein each frame includes information regarding an object and semantic rules, syntactic rules, and relationships of said object to other objects in the database system.

10. The database system of claim 1, further comprising a distributed transaction processor coupled to the logical database system and is accessible by users at a plurality of nodes of the database system.

11. The database system of claim 1, wherein the dynamic view manager includes a view definition editor which includes means for creating a view definition, wherein a view definition is a subset of the knowledge base with additional knowledge.

12. The database system of claim 11, wherein the dynamic view manager further includes a view data editor coupled to the view definition editor and includes means for performing database operations using the view defined by the view definition.

* * * * *

UNITED STATES PATENT AND TRADEMARK OFFICE
CERTIFICATE OF CORRECTION

PATENT NO. : 5,649,190
DATED : July 15, 1997
INVENTOR(S) : Jamshid Sharif-Askary et al.

It is certified that error appears in the above-indentified patent and that said Letters Patent is hereby corrected as shown below:

```
Please change two of the inventors' names as follows:
Change "Vijay Rohela" to --Vijay Ruhela--; and
Change "Irahim Yaseen" to --Rahim Yaseen--.
```

Signed and Sealed this

Ninth Day of September, 1997

BRUCE LEHMAN

Attest:

Attesting Officer

Commissioner of Patents and Trademarks